United States Patent [19]

Scheller

[11] Patent Number: 4,541,238
[45] Date of Patent: Sep. 17, 1985

[54] PROCESS FOR THE CONTROL OF THE MIXTURE RATIO OF FUEL AND OXIDIZER FOR A LIQUID FUEL MOTOR BY MEASURING FLOWS, AND CONTROL SYSTEMS FOR CARRYING OUT THIS PROCESS

[75] Inventor: Alfred K. Scheller, Palaiseau, France

[73] Assignee: Centre National d'Etudes Spatiales, France

[21] Appl. No.: 482,406

[22] Filed: Apr. 6, 1983

[30] Foreign Application Priority Data

Apr. 8, 1982 [FR] France .................. 82 06202

[51] Int. Cl.[4] .................................. F02K 9/48
[52] U.S. Cl. .................... 60/204; 60/240; 60/259
[58] Field of Search .......... 60/204, 240, 243, 39.27, 60/259; 417/2, 3, 46, 47; 137/88, 98, 99, 100, 101.19

[56] References Cited

U.S. PATENT DOCUMENTS

| 2,687,168 | 8/1954 | Haviland | 60/39.27 |
| 2,759,424 | 8/1956 | Defibaugh et al. | 417/3 |
| 2,816,417 | 12/1957 | Bloomberg . | |
| 3,058,303 | 10/1962 | Mulready . | |
| 3,069,849 | 12/1962 | Crim | 60/39.27 |
| 3,073,110 | 1/1963 | Dillaway . | |
| 3,080,876 | 3/1963 | Adamson | 137/100 |
| 3,095,740 | 7/1963 | Peacock | 60/240 |

FOREIGN PATENT DOCUMENTS

1156430 12/1957 France .
1276442 10/1961 France . .

Primary Examiner—Louis J. Casaregola
Attorney, Agent, or Firm—Wigman & Cohen

[57] ABSTRACT

The process comprises the comparison of the flows of fuel and oxidizer measured at the outlet of the turbopumps with a set value corresponding to the optimum value of the mixture. The set value is periodically modified in dependence on the volumes of fuel and oxidizer remaining in the tanks. The control system for carrying out the process comprises a control valve controlled by an electronic device processing the measurements and disposed in a fuel or oxidizer supply pipe of a driving gas generator for the turbine of a turbopump or in the gas supply pipe of a turbopump, or disposed between the two pipes supplying the same fuel or oxidizer two driving gas generators, or between the gas outlets of the two turbines of the turbopumps.

3 Claims, 11 Drawing Figures

PROCESS FOR THE CONTROL OF THE MIXTURE RATIO OF FUEL AND OXIDIZER FOR A LIQUID FUEL MOTOR BY MEASURING FLOWS, AND CONTROL SYSTEMS FOR CARRYING OUT THIS PROCESS

The invention relates to a process for the control of the mixture ratio of fuel and oxidizer for a liquid fuel and oxidizer motor by measuring flows, in particular for a cryogenic motor, which process consists in measuring the flow of the fuel and oxidizer at the outlet of the turbopumps, comparing it with a set value, and acting on the speed of the turbines of the turbopumps, and also relates to regulators for carrying out this process.

The motors of a launcher or of the successive stages of a launcher are designed to operate for a certain period of time corresponding to the combustion of determined masses of fuel and oxidizer. The mixture ratio of the fuel and oxidizer must be kept within certain limits corresponding to maximum thrust. In theory, the entire mass of fuel and oxidizer contained in the tanks should be used on the extinction of the motor, and this result could be obtained by a predetermined functioning of the turbopumps. In practice, the variations of temperature and pressure undergone by the elements of the motor make it necessary to measure the mass of the fuel and oxidizer at the outlet of the turbopumps. These measurements, made by flow meters and corrected for temperature and pressure, are compared with a set value of an optimum mixture of fuel and oxidizer, and the errors detected control the motors of valves disposed on the supply circuit of the turbopump gas generators. The more or less complete exhaustion of the fuel and oxidizer will therefore depend to a great extent on the accuracy of the measurements, which is directly linked to the accuracy of the flow meters. In the present state of the art it is not possible to obtain measurements with an accuracy higher than 1%, and this can be done only with vane type flow meters, which are relatively fragile instruments which cannot be subjected to overspeeds. This exceeding of the maximum permissible speed occurs in particular in cryogenic motors when cold is applied as the result of the vaporisation of the liquids. In order to avoid damage to the flow meters, it is therefore necessary to make special arrangements.

The American space shuttle makes use of a control process of the mixture ratio of the fuel and oxidizer of the closed loop type, which is similar to that described above and is therefore dependent on the accuracy of the measurements of flow.

The use of flow meters, even if they are accurate, does not ensure complete exhaustion of the fuel and oxidizer, and the wastage of fuel and oxidizer may easily attain several hundreds of kilograms. The amounts of fuel and oxidizer which are not used reduce the performance of the stage, the final mass being greater than was intended, and entail a reduction of the payload.

The process for the control of the mixture ratio of the fuel and oxidizer according to the invention seeks to achieve the complete exhaustion of the fuel and oxidizer whatever disturbances occur in the course of operation and whatever the functional dispersions of the components of the motor, while keeping the mixture ratio within a range compatible with the operation of the motor close to its maximum performance.

The invention also relates to means for carrying out the process.

The explanations and figures given below by way of example will enable it to be understood how the invention can be put into practice.

FIG. 2 shows diagrammatically an example of a supply circuit for a separated flow cryogenic motor.

FIG. 3 shows diagrammatically an example of a supply circuit for an integrated flow cryogenic motor.

FIG. 5 shows the functional diagram of a separated flow motor having two gas generators.

FIG. 6 shows the functional diagram of an integrated flow motor having two combustion prechambers.

Figure 1:
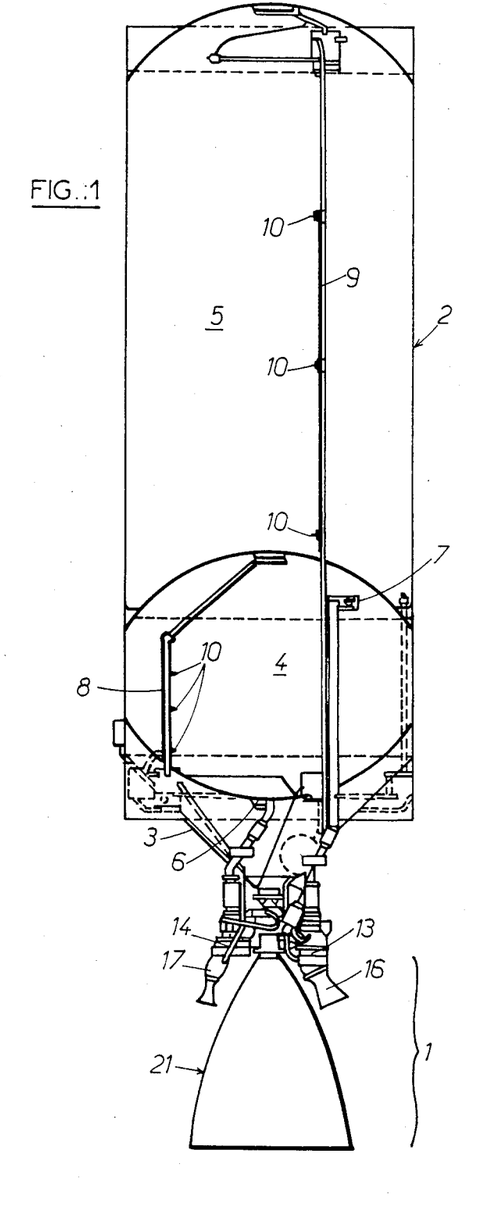
FIG. 1 shows a propulsion assembly for a space launcher.

FIG. 1 shows diagrammatically in partial section a propulsion assembly comprising a rocket motor 1 operating with fuel and oxidizer, and in particular with cryogenic fuel and oxidizer, together with its supply tanks 2. The motor, of the separated flow type, is mounted in conventional manner on the structure which comprises the frame 3 and the casing of the tanks 2. The liquid oxygen tank 4 and the liquid hydrogen tank 5 are disposed coaxially and are provided at their bottoms in known manner with the connectors 6 and 7 respectively for filling with liquid oxygen and with liquid hydrogen. In accordance with their heights, the tanks are provided with gas pipes 8 and 9 respectively, which have their outlets at the respective tops of the tanks and which serve for pressurisation.

Level detectors 10, may optionally be used as filling probes.

The hydraulic diagram of a separated flow motor is shown in FIG. 2. The turbines 11 and 12 of the turbopumps 13 and 14 respectively for liquid hydrogen L H 2 and for liquid oxygen L O X are operated by the gases produced by the combustion of fuel and oxidizer with a low mixture ratio in a gas generator 15. These gases are then ejected directly through secondary nozzles 16 and 17 to supply a propulsive force of low specific impulse (SPI). The flow of fuel and oxidizer in the gas generator must be as low as possible in relation to the total flow ($\simeq 4\%$), so that the turbines operate with low flow and high expansion ratio.

The fuel and oxidizer pumped from the tanks 4 and 5 are delivered either directly into the combustion chamber 18 of the motor by way of the pipe 19, or indirectly by way of the pipe 20, part of the hydrogen serving to cool the nozzle 21 and the combustion chamber of the motor. Lines 22 and 23 provided on the main pipes 19 and 20 supply the fuel and oxidizer to the gas generator 15, whose outlet is connected by the pipe 24 to the turbines 11 and 12. A control device 25, consisting of a calibrated orifice diaphragm and/or an adjustable valve, makes it possible to control the flows of gas feeding the turbines. The gas lines 8 and 9 are branched off respectively from the cooling system of the chamber 18 and from the oxygen pipe 19. The pipes supplying the fuel and oxidizer to the gas generator or to the combustion prechamber are provided with injection valves which are operated when the motor is put into action. In the figures these valves are given three-digit references starting with 26. These same pipes carry control devices in the form of diaphragms or adjustable valves which are given three-digit references starting with 27 and which permit control of the flows of the fuel and oxidizer.

FIG. 3 shows the hydraulic diagram of an integrated flow motor. Members similar to those in the preceding example are given the same references. In a motor of this kind the gases which have operated the turbines are conducted through the pipes 28 and 29 into the combustion chamber 18, in which they are burned again in order to supply a maximum specific propulsion impulse. The flow branched off from the main flow into the gas generator 15 is substantial ($\approx 30\%$) and the expansion ratio in the turbines 11 and 12 is low. The pressures in the gas generator and at the outlet of the turbines are high and are above the pressure in the combustion chamber.

The liquid hydrogen L H 2 under pressure is delivered through the main pipe 20 into a distribution system comprising an injection valve 264 and two diaphragm branches 274, 275 effecting the cooling of the nozzle 21 and of the combustion chamber 18, and also the feeding of the latter.

Part of the liquid hydrogen supplies, by way of the pipe 23, the gas generator 15. Since the amount of hydrogen is large, it is necessary to supply to the generator an amount of liquid oxygen with adequate flow and pressure. In order to do this, the oxygen taken from the outlet of the pump is taken back by a separate stage 30 of the pump driven by the turbine 12 and, after being passed through a control device 276, is delivered into the generator 15.

The amounts of fuel and oxidizer necessary for supplying a single gas generator being relatively large in an integrated flow motor, and the gas pressure being high, the control of the speed of the turbines, and consequently of the flows of the pumps is difficult, and in practice each turbine is supplied by a separate generator, as will be described later on with reference to the simplified functional diagram shown in FIG. 7.

The control process of the mixture ratio of the fuel and oxidizer for a liquid fuel and oxidizer motor according to the invention is applied to the control of separated or integrated flow motors having one or two gas generators as described above, but also to motors having one or two combustion prechambers as described later on.

In a general way, the gas generators or the combustion prechambers serve the purpose of supplying the gas driving the turbines of the turbopumps with a sufficient flow and pressure.

This flow and this pressure depend on the type of integrated flow or separated flow motor, and it is theoretically possible, whatever the type of motor, to supply the two turbines by means of a single driving gas generator, or to supply each of the turbines by means of an independent driving gas generator, the expression "driving gas generator" being used here in its widest sense, for example a gas generator or a combustion prechamber.

The control process according to the invention comprises the following operations:

. measurement of the flow of the fuel and oxidizer the H and O output of the turbopumps;

. comparison of the ratio of the flows measured with a set value corresponding to the optimum value of the mixture, the set value being at least periodically modified in dependence on the volumes of fuel and oxidizer remaining in the tanks;

. modification of the flow of driving gas supplying at least one of the turbopumps in dependence on the difference between the ratio of the measured flows of the fuel and oxidizer and the set value, in such a manner as to achieve the complete exhaustion of the fuel and oxidizer on termination of the operation of the motor.

The direct or indirect modification of the flow of driving gas supplying at least one of the turbopumps is achieved, in accordance with a modification of the process, by modifying the flows of the fuel and oxidizer supplying at least one of the driving gas generators of a turbopump.

The performance of this process will be better understood by reference to the functional diagrams explained below.

Figure 4:
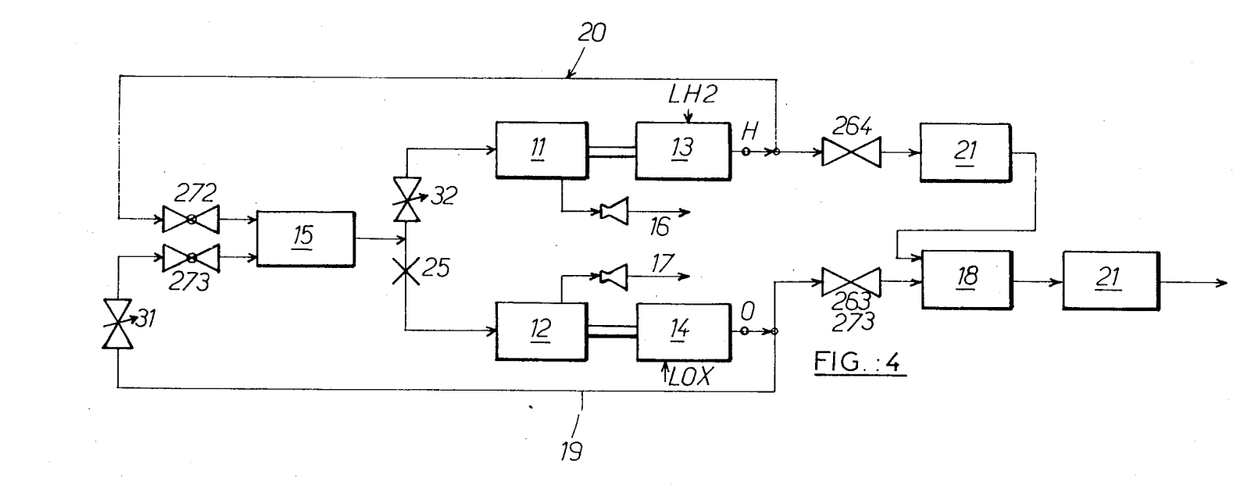
FIG. 4 shows the functional diagram of a separated flow motor having a single gas generator.

The functional diagram of the separated flow motor, shown in FIG. 4, corresponds to the hydraulic diagram of the motor shown in FIG. 2. Corresponding elements are given the same references. The flows of the propergols supplying the combustion chamber 18 are measured at the outlet of the pumps 13 and 14, and a control signal, taking into account a certain number of parameters which will be specified later on, is produced by a control device to act on the motor of at least one control valve for one of the fuel and oxidizer supplying the gas generator, and/or on the control valve disposed in the gas supply circuit of one of the turbines. The control is generally applied to the fuel and oxidizer whose flow is the lower, and in particular to the liquid oxygen, the flow of which is substantially lower than that of the hydrogen. In order to do this, use is made of a control valve 31 disposed upstream of the calibrated orifice diaphragm 273. The supply of hydrogen is controlled by a diaphragm 272. Control of the oxygen makes it possible to adjust the total amount of gas produced which serves to drive the turbines, and therefore acts on the thrust but does not make it possible to act independently on the speed of each of the turbines and therefore on the flow of the pumps. The amounts of gas distributed to each turbine are fixed by a diaphragm 25 disposed, for example, on the gas pipe supplying the turbine 12 of the oxygen pump 14. The independent control of the flow of the pumps is achieved by means of a control valve 32 disposed, for example, on the gas supply of the turbine 11 of the hydrogen pump 13. The valve 31 acts on the total flow of the fuel and oxidizer delivered into the combustion chamber, while the valve 32, controlled by a control system utilising the process according to the invention, acts more particularly on the ratio of the flows of the two fuel and oxidizer.

The diagram shown in FIG. 5 corresponds to the mode of operation of a separated flow motor similar to that shown in FIGS. 2 and 4, but with two separate gas generators 151, 152. Each generator is supplied in parallel respectively from the hydrogen pipe 20 and the oxygen pipe 19 via diaphragms 274, 275, 276, 277. Upstream of the diaphragms 276 and 277 are provided control valves 33 and 34, of which at least one is used for the control of the mixture ratio of the fuel and oxidizer utilising the process in accordance with the invention, the other valve optionally being acted by a thrust regulator.

FIG. 6 is a functional diagram of an integrated flow motor similar to that shown in FIG. 3, but in which each turbopump 11, 12 is equipped with a combustion prechamber 35, 36 instead of a gas generator. As in the example shown in FIG. 5, control of the fuel and oxidizer is effected by control valves 37, 38 provided on the oxygen supply of the combustion prechambers. At least one of the valves, for example that supplying the turbopump with liquid oxygen, is controlled by a regulator making use of the process in accordance with the invention, the other valve optionally being controlled by a thrust regulator.

Figure 7:
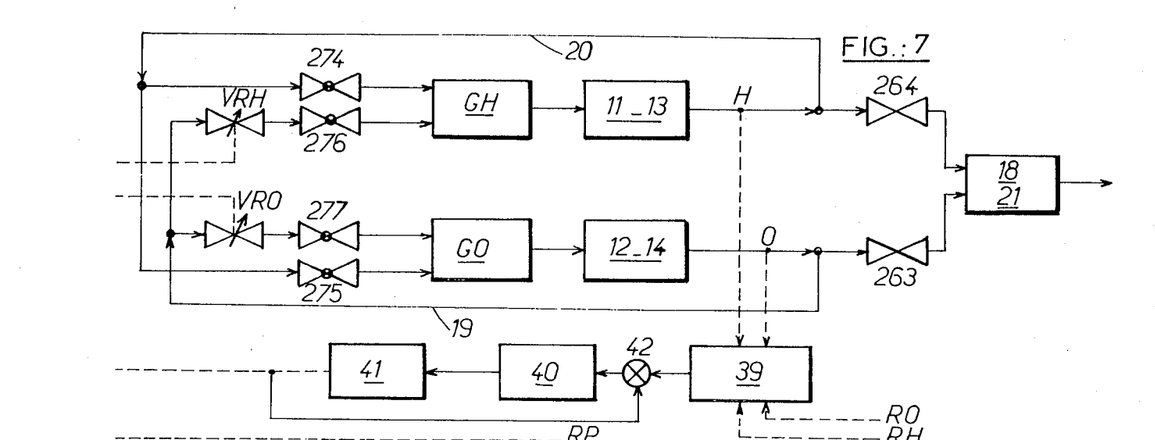
FIG. 7 shows a condensed functional diagram of a motor whose turbopumps are supplied separately by gas generators or combustion prechambers.

FIG. 7 shows a condensed functional diagram of an integrated flow or separated flow motor corresponding to those shown in FIGS. 5 and 6, similar elements being given the same references.

The turbopumps 11–13, 12–14 are supplied separately by the gas generators or combustion prechambers GH, GO, which are equipped with regulating valves VRH and VRO. The measurements of flow are made at the outlet of the pumps 11–13, 12–14 for H and O, and the values obtained are processed in an electronic device 39 for the processing of the measurements, in which device their ratio is compared with a set value corresponding to a fuel and oxidizer mixture value contained within a range for which the operation of the motor is considered optimum. The set value is modified at least periodically by the measurements RO, RH of the levels of fuel and oxidizer remaining in each of the oxygen and hydrogen tanks, in such a manner as to achieve the complete exhaustion of the fuel and oxidizer at the termination of the operation of the motor, this set value remaining within the range of optimum operation.

The control signal produced by the electronic device acts on an amplifier device 40 which controls a motor device 41 adjusting the valve V R O. Depending on whether the type of control adopted is electrical, the control signal will be received by an electronic amplifier 40 to operate the motor 41 of the valve V R O proportionally to the signal; or if it is fluidic, the control signal will operate a servo valve 42–40 controlled in respect of position, which will supply an actuator 41 controlling the valve V R O.

In a preferred example of embodiment the measurement of the levels of the fuel and oxidizer in the tanks is limited to discrete detections of level effected by the level detectors 10 (FIG. 1). Consequently, the set value remains constant between two detections.

Good accuracy together with satisfactory stability is obtained by supplementing the functions of the electronic device 39 with a correcting network taking into account the inertias of the turbopumps and the thermal inertia of the combustion chamber, as well as that of the gas generators or combustion prechambers.

The modification of the mixture ratio of the fuel and oxidizer on only one of the gas generators or combustion prechambers produces a variation of the thrust of the motor. This variation, although slight, may be troublesome and need control means for the mixture of the fuel and oxidizer the other generator or chamber. These means consist of a thrust regulator RP which acts on the regulating valve VRH.

The mixture ratio control system according to the invention comprises an electronic device 39 for the processing of measurements, at least one detector 10 of the level in the tanks, transmitting signals to the electronic device, flow meters H, O disposed at the outlet of the fuel and oxidizer pumps supplying the combustion chamber 18 of the motor, these meters transmitting the measurements to the electronic device, an amplifier device 40 receiving a control signal produced by the electronic device, a motor device 41, and a regulating valve VRO or 32 (FIG. 4) directly or indirectly controlling the flow of driving gas of at least one turbopump, the said valve being operated by the motor device, and an associated power source (generator or electric battery, hydraulic pump, pneumatic motor, etc.).

Depending on the different forms of construction of the control system, the control valve is disposed in a fuel and oxidizer supply pipe of at least one of the gas generators or one of the combustion prechambers (FIGS. 5, 6, 7), or in a driving gas supply pipe of a turbopump (FIG. 4).

The control process of the fuel and oxidizer mixture ratio according to the invention is equally well applicable to mass flow measurements as to volumetric flow measurements. Although the evolution of the mixture ratios is not the same in the two cases, the differences will remain slight because the conventional process of control with a fixed set value had as its aim the exhaustion of the fuel and oxidizer. The measurement of the temperatures and pressures in the tanks and at the flow measurement level made it possible to correct the mass flows measured in such a manner that their ratio can be compared, under the same conditions, with the set value.

The same will be the case in the process according to the invention, for a set value corresponding to the mass ratio. The temperatures and pressures in the tanks and at the flow measurement level must then be taken into account for the processing of the control signal produced by the measurement processing electronic device. In cases where the set value corresponds to the volumetric mixture ratio of the fuel and oxidizer, the measurements of temperature and pressure are no longer required.

The process makes it possible to use flow meters whose accuracy does not play an important part in the obtaining of the result, only fidelity and sensitivity being required. These properties are standard in conventional flow meters. In particular, it is possible to use venturi flow meters containing no moving parts and consequently capable of being subjected to considerable differences in the speed of the fluid passing through them. These conditions occur when cold is applied to the motor. The obligatory redundancy of the measuring instruments is resolved by the formation of a plurality of measurement outputs in the body of the flow meter, without any substantial increase of mass being entailed. The error due to the accuracy of the flow meters is considered as a general disturbance in the same way as the functional dispersions of the components of the motor, and the readjustment of the set value of the mixture ratio takes it into account.

The mixture ratio regulator, as described above, brings about during its operation a slight variation of the thrust of the motor. This influence can be cancelled by modifying the position of the regulating valve of the regulator in the fuel and oxidizer supply systems of the combustion chamber of the motor.

According to this modification, the control valve connects two corresponding elements of the two fuel and oxidizer supply systems of the motor, the pressure or the flow in one of the systems being higher than in the other.

By "fuel and oxidizer supply system" should be understood a gas generator or combustion prechamber, whether it supplies one or two turbines, together with its fuel and oxidizer supply, a turbopump and its driving gas supply or its exhaust.

Figure 8:
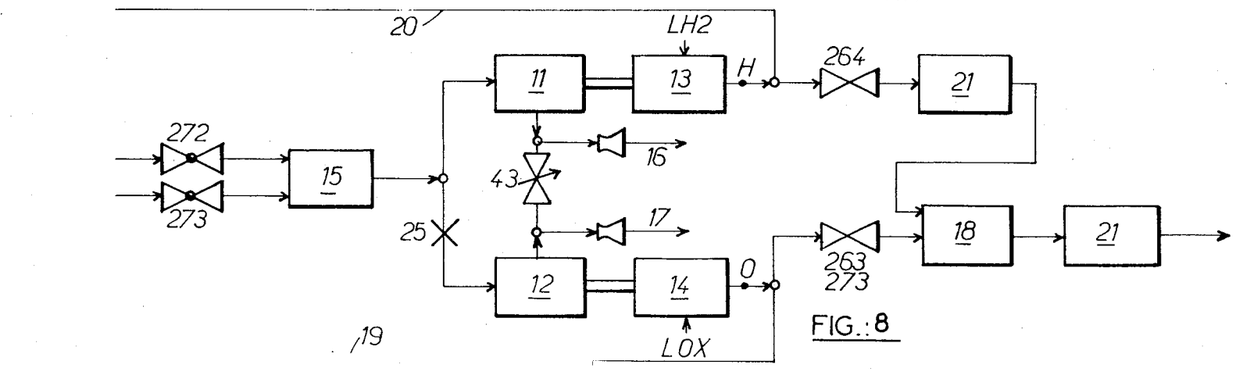
FIG. 8 shows a variant of the diagram shown in FIG. 4.

In the form of construction of the control system which is shown in FIG. 8, the control valve 43 is disposed at the outlet of the turbines 11 and 12 driving the fuel and oxidizer supply pumps 13 and 14, a separated flow motor comprising a single gas generator or combustion prechamber 15. Elements similar to those in FIG. 4 are given the same references.

In the cryogenic motor of the example, since the flow of hydrogen must be greater than the flow of oxygen, the turbine 11 will be supplied with gas with a flow or at a pressure higher than that of the turbine 12. However, whatever the type of fuel and oxidizer used, it will always be possible to adapt the elements of a supply system in such a manner as to have a difference of pressure or flow between the two interconnected elements. When there is no intervention by the control valve, this difference results in circulation with constant flow, which is taken into account for the supply of each turbopump, for example by control systems of the diaphragm 25.

By acting on the control valve, the distribution of the energy levels of the turbines is varied; these will evolve in opposite directions. This results in an additive action on the mixture ratio at the outlet of the pumps and in a subtractive action on the thrust.

Figure 9:
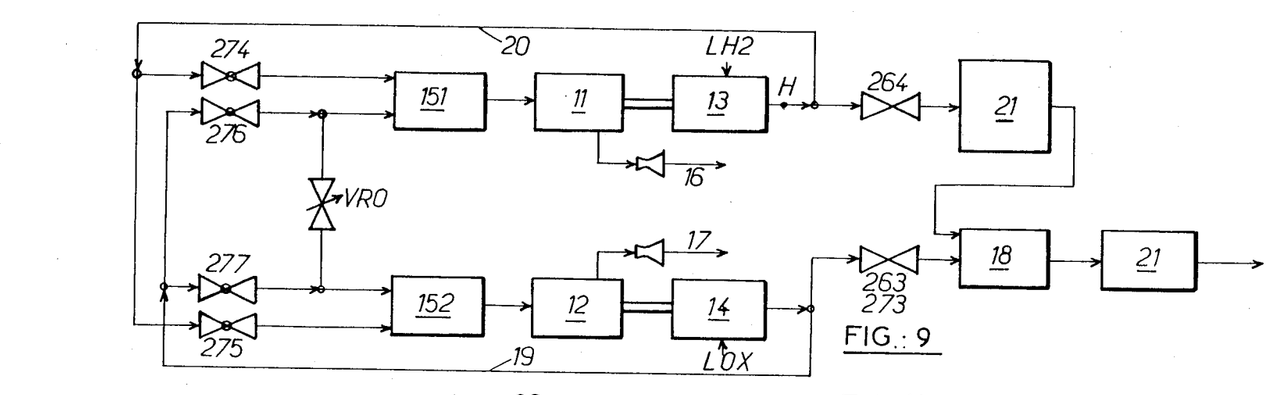
FIG. 9 shows a variant of the diagram shown in FIG. 5.

FIG. 9 shows an example of the location of the control valve for a separated flow motor having two gas generators or combustion prechambers. The valve connects together the supply pipes for the same propergol in each of the two supply systems of the motor, between the calibrated orifice diaphragms 276-277 and the generators 151-152. The diaphragms are arranged in such a manner as to permit, circulation of fuel and oxidizer, with the valve open, between the two systems without modification of the initial mixture ratio of the fuel and oxidizer supplying the generators or the prechambers 151-152.

Figure 10:
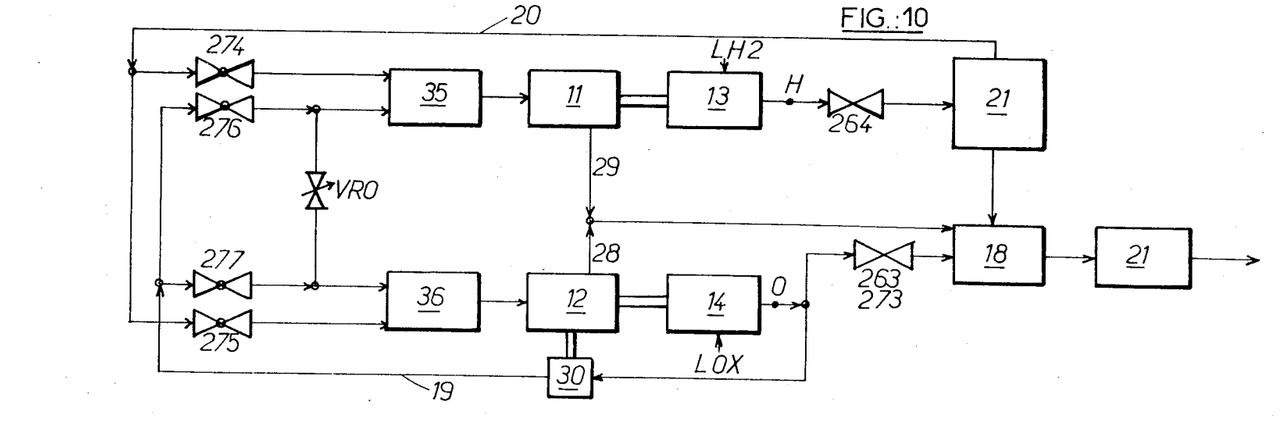
FIG. 10 shows a variant of the diagram shown in FIG. 6.

FIG. 10 shows an example of the location of the control valve for an integrated flow motor. The same remarks as were made in connection with the preceding Figure also apply to this case.

The location of the control valve between the supplies of the same fuel and oxidizer to the generators or prechambers provides the advantage of controlling a slight flow, and consequently only a valve of small dimensions and simple construction is required. However, as has been stated previously, the valve can be placed between the driving gas pipes, but the temperature of the latter then requires a valve of special characteristics.

In the preceding examples the evolution of the thrust in dependence on the displacement of the valve controlling the mixture ratio can be achieved by means of a calibrated pressure loss device (for example a diaphragm) in the pipe downstream of the connections of the control valve.

Figure 11:
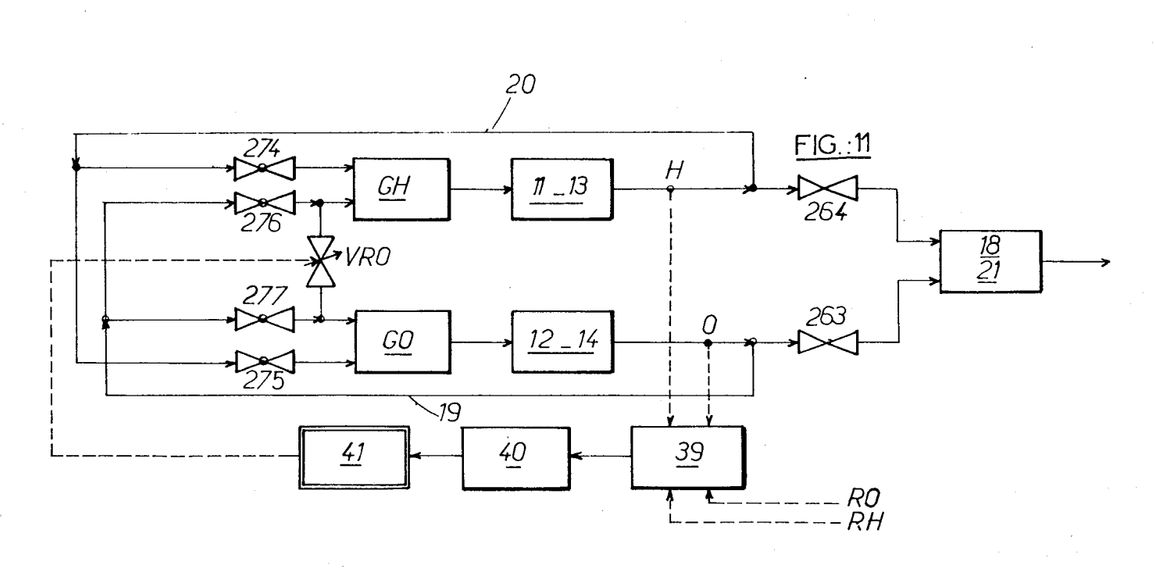
FIG. 11 shows a variant of the diagram shown in FIG. 7.

FIG. 11 shows the control system for the mixture ratio of the fuel and oxidizer with its control valve fitted, in a general case of a motor having two generators or prechambers, between the pipes for the same fuel and oxidizer of two supply systems.

The mode of operation of the control system is in all respects identical to that described in connection with FIG. 7, and similar elements are given the same references.

The measurement processing electronic device 39 compares the ratio of the measurements of the flows of fuel and oxidizer H and O with the set value which is modified at least periodically in dependence on the levels of fuel and oxidizer RO and RH remaining in the tanks. On the basis of these measurements, it prepares a control signal, which is amplified in an amplifier 40 in order to control the motor device 41 of the control valve VRO.

In the regulators described so far, the control signal coming from the measurement processing electronic device acts on a controlled linear system—a two-directional motor or torque motor or a servo valve controlled in respect of position. Systems of these kinds are more particularly suitable for the cases of FIGS. 4 to 7 in which it is not desirable to act by the plus or minus method. On the other hand, in the cases of FIGS. 8 to 11, controlling by the plus or minus method may be contemplated by using a non-linear controlled system.

A non-linear device of the plus or minus type makes it possible for the system always to work at the maximum of its possibilities. In addition, the measurement processing electronic device can optimise the switching moments by addressing the control commands to the plus or minus device at moments of time defined by a switching curve.

The control system having a non-linear device makes it possible to use simpler means by replacing the servo valves and their power source (electric motor or hydraulic actuator) with an electronic relay and an electrovalve.

I claim:

1. A process for the control of the mixture ratio of fuel and oxidizer for a rocket engine by flow measuring, comprising the steps of:
   supplying fuel and oxidizer to means for generating gas;
   supplying gas generated by the generating means to two turbopumps;
   supplying fuel to the rocket engine by one of the turbopumps;
   supplying oxidizer to the rocket engine by the other of the turbopumps;
   measuring the respective flows of the fuel and oxidizer to the rocket engine;
   using the flow measurements to simultanteously and inversely control the operation of the turbopumps to ensure that fuel and oxidizer are delivered to the rocket engine in a proper ratio.

2. The process according to claim 1 wherein the means for generating gas comprises two gas generators, each of which is connected to a respective turbopump and the operation of the turbopumps is controlled by adjusting a control valve that controls the relative flow of oxidizer to each of the two gas generators.

3. The process according to claim 1, further comprising the steps of;
   measuring the quantity of fuel and oxidizer available for combutsion; and
   using the fuel quantity measurements together with the flow measurements to simultaneously and inversely control the operation of the turbopumps to ensure that fuel and oxidizer are delivered to the rocket in a proper ratio.

* * * * *